United States Patent
Hegde et al.

(10) Patent No.: US 12,293,085 B2
(45) Date of Patent: May 6, 2025

(54) DATA STORAGE DEVICE AND METHOD FOR IMPROVING ASYNCHRONOUS INDEPENDENT PLANE READ (AIPR) UTILIZATION

(71) Applicant: Western Digital Technologies, Inc., San Jose, CA (US)

(72) Inventors: Pradeep Seetaram Hegde, Uttar Kannada (IN); Ramanathan Muthiah, Bangalore (IN); Nagaraj Dandigenahalli Rudrappa, Davangere (IN); Vimal Kumar Jain, Bangalore (IN)

(73) Assignee: Sandisk Technologies, Inc., Milpitas, CA (US)

( * ) Notice: Subject to any disclaimer, the term of this patent is extended or adjusted under 35 U.S.C. 154(b) by 0 days.

(21) Appl. No.: 18/225,771

(22) Filed: Jul. 25, 2023

(65) Prior Publication Data

US 2024/0427494 A1  Dec. 26, 2024

Related U.S. Application Data

(60) Provisional application No. 63/521,914, filed on Jun. 20, 2023.

(51) Int. Cl.
G06F 3/06 (2006.01)
G06F 11/16 (2006.01)
G06F 12/02 (2006.01)

(52) U.S. Cl.
CPC .......... *G06F 3/0613* (2013.01); *G06F 3/0659* (2013.01); *G06F 3/0679* (2013.01); *G06F 11/1612* (2013.01); *G06F 12/0246* (2013.01); *G06F 2212/7205* (2013.01)

(58) Field of Classification Search
None
See application file for complete search history.

(56) References Cited

U.S. PATENT DOCUMENTS

| | | | |
|---|---|---|---|
| 10,685,722 B1 * | 6/2020 | Sharma | G11C 7/02 |
| 2011/0099460 A1 * | 4/2011 | Dusija | G11C 16/3495 |
| | | | 711/E12.001 |
| 2014/0258596 A1 * | 9/2014 | Kojima | G06F 12/0246 |
| | | | 711/103 |
| 2016/0179406 A1 * | 6/2016 | Gorobets | G06F 11/079 |
| | | | 711/103 |
| 2017/0286288 A1 * | 10/2017 | Higgins | G06F 12/0246 |
| 2019/0042375 A1 * | 2/2019 | Bradshaw | G06F 3/0679 |
| 2020/0151117 A1 * | 5/2020 | Um | G06F 3/064 |
| 2021/0382780 A1 * | 12/2021 | Muthiah | G06F 11/0757 |

(Continued)

OTHER PUBLICATIONS

Higuchi et al. "A 1Tb 3b/Cell 3D-Flash Memory in a 170+ Word-Line-Layer Technology." Feb. 2021. IEEE. ISSCC 2021. pp. 428-430.*

*Primary Examiner* — Nathan Sadler
(74) *Attorney, Agent, or Firm* — Crowell & Moring LLP

(57) ABSTRACT

Some data storage devices have a plurality of memory dies that can be read in parallel for certain types of read requests. Read requests pertaining to a garbage collection operation are often generated sequentially and, thus, are not eligible for parallel execution in the memory dies. In an example data storage device presented herein, such read requests are consolidated and sent to the memory for execution in parallel across the memory dies.

19 Claims, 17 Drawing Sheets

(56) References Cited

U.S. PATENT DOCUMENTS

| | | | |
|---|---|---|---|
| 2022/0011967 A1* | 1/2022 | Mekhanik | G11C 29/50 |
| 2022/0083266 A1* | 3/2022 | Prakash | G06F 3/0679 |
| 2022/0188234 A1* | 6/2022 | Na | G06F 12/0253 |
| 2022/0310174 A1* | 9/2022 | Deng | G11C 7/08 |
| 2023/0244615 A1* | 8/2023 | Yang | G11C 8/12 |
| | | | 711/154 |
| 2023/0281121 A1* | 9/2023 | Yanes | G06F 12/0246 |
| | | | 711/103 |
| 2024/0086317 A1* | 3/2024 | Fu | G11C 16/26 |

* cited by examiner

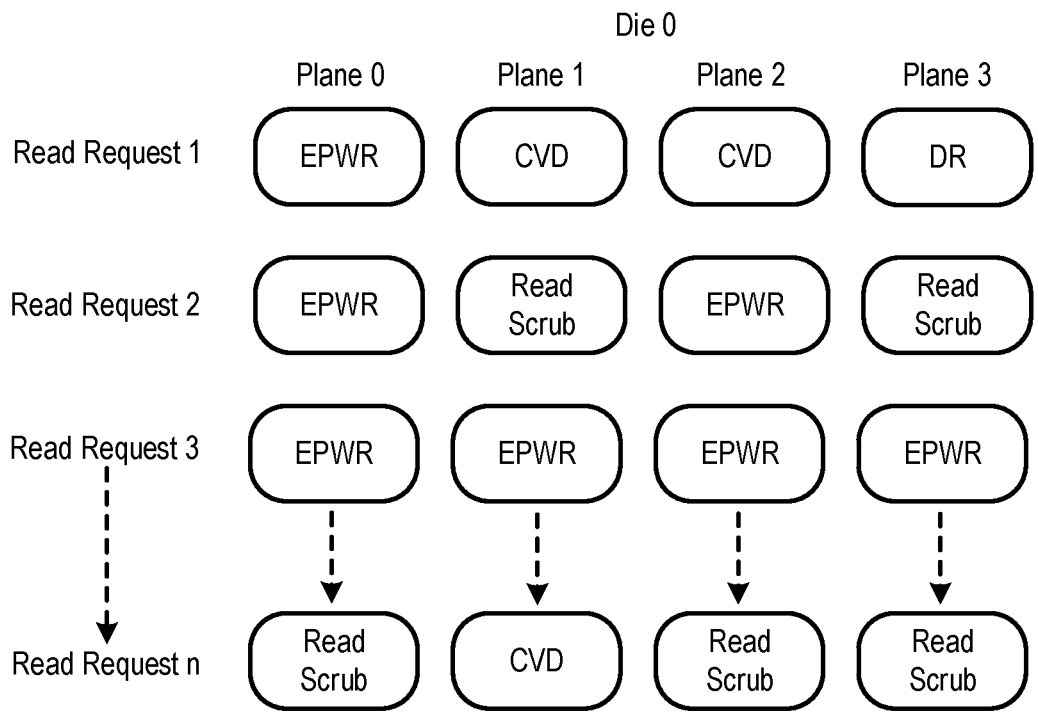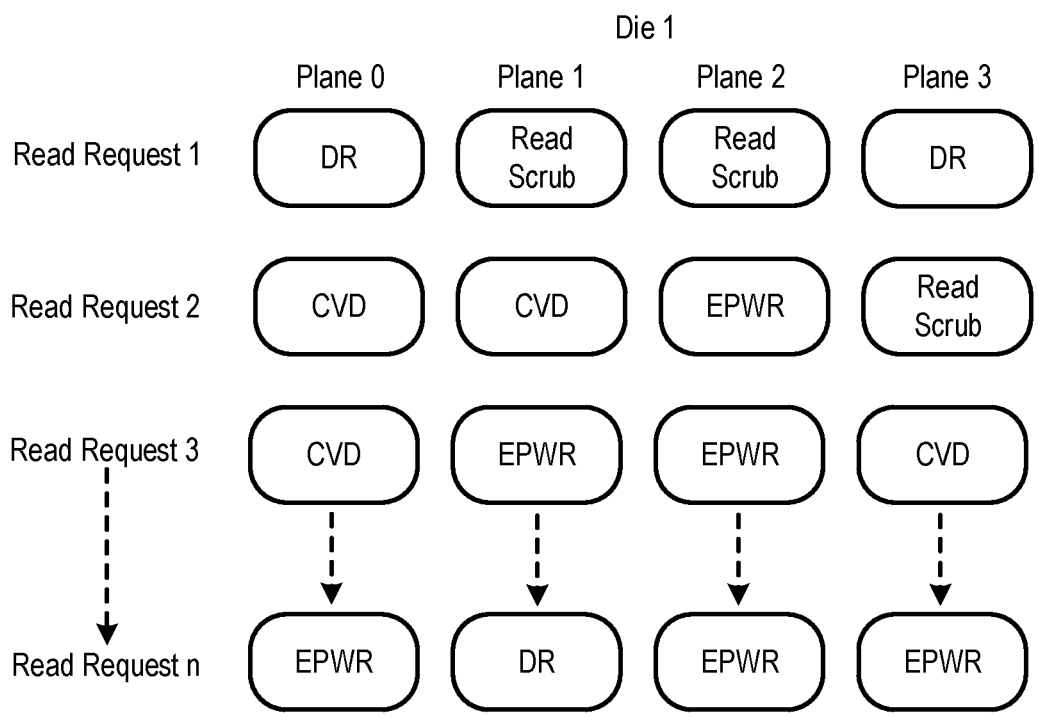
FIG. 6A

| Block Num | P0 | P1 | P2 | P3 | ...... | Pn |
|---|---|---|---|---|---|---|
| Block 10 | BER Read on plane 0 | | | | ...... | |
| Block 15 | | BER Read on plane 1 | | | ...... | |
| Block 22 | | | BER Read on plane 2 | | ...... | |
| Block 30 | | | | BER Read on plane 3 | ...... | |
| * | | | | | ...... | |
| * | | | | | ...... | |
| * | | | | | ...... | |
| Block N | | | | | ...... | BER Read on plane N |

FIG. 8

| Block Num | Tier Num/ Planes | P0 | P1 | P2 | P3 | -------- | | | Pn |
|---|---|---|---|---|---|---|---|---|---|
| | Tier 0 (WL 0 to 50) | BER Read on plane 0 | | | | -------- | | | |
| | Tier 1 (WL 51 to 100) | | BER Read on plane 1 | | | -------- | | | |
| | Tier 2 (WL 101 to 150) | | | BER Read on plane 2 | | -------- | | | |
| | Tier 3 (WL 151 to 200) | | | | BER Read on plane 3 | -------- | | | |
| Block 10 | * | | | | | -------- | | | |
| | * | | | | | -------- | | | |
| | * | | | | | -------- | | | |
| | * | | | | | -------- | | | |
| | Tier 0 (WL N-50 to N) | | | | | -------- | | | BER Read on plane N |
| | Tier 0 (WL 0 to 50) | BER Read on plane 0 | | | | -------- | | | |
| | Tier 1 (WL 51 to 100) | | BER Read on plane 1 | | | -------- | | | |
| | Tier 2 (WL 101 to 150) | | | BER Read on plane 2 | | -------- | | | |
| | Tier 3 (WL 151 to 200) | | | | BER Read on plane 3 | -------- | | | |
| Block 20 | * | | | | | -------- | | | |
| | * | | | | | -------- | | | |
| | * | | | | | -------- | | | |
| | * | | | | | -------- | | | |
| | Tier 0 (WL N-50 to N) | | | | | -------- | | | BER Read on plane N |
| | Tier 0 (WL 0 to 50) | BER Read on plane 0 | | | | -------- | | | |
| | Tier 1 (WL 51 to 100) | | BER Read on plane 1 | | | -------- | | | |
| | Tier 2 (WL 101 to 150) | | | BER Read on plane 2 | | -------- | | | |
| | Tier 3 (WL 151 to 200) | | | | BER Read on plane 3 | -------- | | | |
| Block 30 | * | | | | | -------- | | | |
| | * | | | | | -------- | | | |
| | * | | | | | -------- | | | |
| | * | | | | | -------- | | | |
| | Tier 0 (WL N-50 to N) | | | | | -------- | | | BER Read on plane N |

FIG. 9

| String Line | logical page/Planes | P0 | P1 | P2 | P3 | ... | Pn |
|---|---|---|---|---|---|---|---|
| String 0 | lower page | BER Read on plane 0 | | | | ... | |
| | middle page | | BER Read on plane 1 | | | ... | |
| | upper page | | | BER Read on plane 2 | | ... | |
| | top page | | | | BER Read on plane 3 | ... | |
| String 1 | lower page | | | | | ... | |
| | middle page | | | | | ... | |
| | upper page | | | | | ... | |
| | top page | | | | | ... | |
| | * | | | | | ... | |
| | * | | | | | ... | |
| | * | | | | | ... | |
| String n | Block N | | | | | ... | BER Read on plane N |

FIG. 10

| WL | SL | | LWL | D0 | | | | D1 | | | | D2 | | | | D3 | | | |
|---|---|---|---|---|---|---|---|---|---|---|---|---|---|---|---|---|---|---|---|
| | | | | P0 | P1 | P2 | P3 | P0 | P1 | P2 | P3 | P0 | P1 | P2 | P3 | P0 | P1 | P2 | P3 |
| 0 | 0 | LP | 0 | ▓ | | | | ▓ | | | | ▓ | | | | ▓ | | | |
| | | MP | 1 | | ▓ | | | | ▓ | | | | ▓ | | | | ▓ | | |
| | | UP | 2 | | | ▓ | | | | ▓ | | | | ▓ | | | | ▓ | |
| | | TP | 3 | | | | ▓ | | | | ▓ | | | | ▓ | | | | ▓ |
| | 1 | LP | 0 | ▓ | | | | ▓ | | | | ▓ | | | | ▓ | | | |
| | | MP | 1 | | ▓ | | | | ▓ | | | | ▓ | | | | ▓ | | |
| | | UP | 2 | | | ▓ | | | | ▓ | | | | ▓ | | | | ▓ | |
| | | TP | 3 | | | | ▓ | | | | ▓ | | | | ▓ | | | | ▓ |
| | 2 | LP | 4 | ▓ | | | | ▓ | | | | ▓ | | | | ▓ | | | |
| | | MP | 5 | | ▓ | | | | ▓ | | | | ▓ | | | | ▓ | | |
| | | UP | 6 | | | ▓ | | | | ▓ | | | | ▓ | | | | ▓ | |
| | | TP | 7 | | | | ▓ | | | | ▓ | | | | ▓ | | | | ▓ |
| | 3 | LP | 8 | ▓ | | | | ▓ | | | | ▓ | | | | ▓ | | | |
| | | MP | 9 | | ▓ | | | | ▓ | | | | ▓ | | | | ▓ | | |
| | | UP | 10 | | | ▓ | | | | ▓ | | | | ▓ | | | | ▓ | |
| | | TP | 12 | | | | ▓ | | | | ▓ | | | | ▓ | | | | ▓ |
| | 4 | LP | 8 | ▓ | | | | ▓ | | | | ▓ | | | | ▓ | | | |
| | | MP | 9 | | ▓ | | | | ▓ | | | | ▓ | | | | ▓ | | |
| | | UP | 10 | | | ▓ | | | | ▓ | | | | ▓ | | | | ▓ | |
| | | TP | 12 | | | | ▓ | | | | ▓ | | | | ▓ | | | | ▓ |
| .... | .... | LP | 13 | ▓ | | | | ▓ | | | | ▓ | | | | ▓ | | | |
| | | MP | 14 | | ▓ | | | | ▓ | | | | ▓ | | | | ▓ | | |
| | | UP | 15 | | | ▓ | | | | ▓ | | | | ▓ | | | | ▓ | |
| | | TP | 16 | | | | ▓ | | | | ▓ | | | | ▓ | | | | ▓ |
| N-1 | 4 | LP | | ▓ | | | | ▓ | | | | ▓ | | | | ▓ | | | |
| | | MP | | | ▓ | | | | ▓ | | | | ▓ | | | | ▓ | | |
| | | UP | | | | ▓ | | | | ▓ | | | | ▓ | | | | ▓ | |
| | | TP | | | | | ▓ | | | | ▓ | | | | ▓ | | | | ▓ |

FIG. 11

| WL | SL | | LWL | D0 | | | | D1 | | | | D2 | | | | D3 | | | |
|---|---|---|---|---|---|---|---|---|---|---|---|---|---|---|---|---|---|---|---|
| | | | | P0 | P1 | P2 | P3 | P0 | P1 | P2 | P3 | P0 | P1 | P2 | P3 | P0 | P1 | P2 | P3 |
| 0 | 0 | LP | 0 | Scan 1st | | | | | | | | | | | | | | | |
| | | MP | 1 | | | | | | | | | | | | | | | | |
| | | UP | 2 | | | | | | | | | | | | | | | | |
| | | TP | 3 | | | | | | | | | | | | | | | | |
| 1 | 0 | LP | 0 | | | ▨ | | | | | | | | | | | | | |
| | | MP | 1 | | | | | | | | | | | | | | | | |
| | | UP | 2 | | | | | | | | | | | | | | | | |
| | | TP | 3 | | | | | | | | | | | | | | | | |
| * | * | LP | 0 | | | | ▨ | | | | | | | | | | | | |
| | | MP | 1 | | | | | | | | | | | | | | | | |
| | | UP | 2 | | | | | | | | | | | | | | | | |
| | | TP | 3 | | | | | | | | | | | | | | | | |
| N/2-1 | 0 | LP | 0 | | Scan 3rd | | | | | | | | | | | | | | |
| | | MP | 1 | | | | | | | | | | | | | | | | |
| | | UP | 2 | | | | | | | | | | | | | | | | |
| | | TP | 3 | | | | | | | | | | | | | | | | |
| N/2+1 | 0 | LP | 0 | | | | ▨ | | | | | | | | | | | | |
| | | MP | 1 | | | | | | | | | | | | | | | | |
| | | UP | 2 | | | | | | | | | | | | | | | | |
| | | TP | 3 | | | | | | | | | | | | | | | | |
| 0 | 0 | LP | 0 | | ▨ | | | | | | | | | | | | | | |
| | | MP | 1 | | | | | | | | | | | | | | | | |
| | | UP | 2 | | | | | | | | | | | | | | | | |
| | | TP | 3 | | | | | | | | | | | | | | | | |
| * | * | LP | 0 | ▨ | | | | | | | | | | | | | | | |
| | | MP | 1 | | | | | | | | | | | | | | | | |
| | | UP | 2 | | | | | | | | | | | | | | | | |
| | | TP | 3 | | | | | | | | | | | | | | | | |
| N-1 | 4 | LP | 0 | | | | | | | | | | | | | | | | |
| | | MP | 1 | | | | | | | | | | | | | | | | |
| | | UP | 2 | | | | | | | | | | | | | | | | |
| | | TP | 3 | | | Scan 2nd | | | | | | | | | | | | | |

DATA STORAGE DEVICE AND METHOD FOR IMPROVING ASYNCHRONOUS INDEPENDENT PLANE READ (AIPR) UTILIZATION

CROSS-REFERENCE TO RELATED APPLICATION

This application claims priority to U.S. provisional patent application No. 63/521,914, filed Jun. 20, 2023, which is hereby incorporated by reference.

BACKGROUND

A host can send read requests to read data stored in a memory of a data storage device. In some data storage devices, the memory comprises a plurality of memory dies, and certain read requests can be executed in parallel across the plurality of memory dies.

BRIEF DESCRIPTION OF THE DRAWINGS

FIGS. 6A and 6B illustrate reading data with an AIPR module.

FIG. 8 is a chart illustrating read operations of an embodiment.

FIG. 9 is a chart illustrating read operations of an embodiment.

FIG. 10 is a chart illustrating read operations of an embodiment.

FIG. 11 is a chart illustrating a scan operation of an embodiment.

FIG. 12 is a chart illustrating a scan operation of an embodiment.

FIG. 14 is a chart illustrating a scan operation of an embodiment.

DETAILED DESCRIPTION

The following embodiments generally relate to a data storage device and method for improving asynchronous independent plane read (AIPR) utilization. In one embodiment, a data storage device is provided comprising a memory and a controller. The memory comprise a plurality of memory dies and circuitry configured to sense data from the plurality of memory dies in parallel. The controller is coupled with the memory and configured to: consolidate a plurality of read requests sequentially generated during a garbage collection operation; and send the plurality of read requests to the circuitry in the memory to execute in parallel across the plurality of memory dies.

In another embodiment, a method is provided that is performed in a data storage device comprising a memory comprising a plurality of memory dies and asynchronous independent plane read (AIPR) circuitry. The method comprises: queueing a plurality of read requests sequentially generated during a garbage collection operation; sending the plurality of read requests to the AIPR circuitry; and, with the AIPR circuitry, executing the plurality of read requests in parallel across the plurality of memory dies.

In yet another embodiment, a data storage device is provided comprising: a memory comprising a plurality of memory dies; means for consolidating a plurality of read requests sequentially generated during a garbage collection operation; and means for sensing data from the plurality of memory dies in parallel for the consolidated plurality of read requests.

Other embodiments are possible, and each of the embodiments can be used alone or together in combination. Accordingly, various embodiments will now be described with reference to the attached drawings.

EMBODIMENTS

The following embodiments relate to a data storage device (DSD). As used herein, a "data storage device" refers to a device that stores data. Examples of DSDs include, but are not limited to, hard disk drives (HDDs), solid state drives (SSDs), tape drives, hybrid drives, etc. Details of example DSDs are provided below.

Figure 1A:
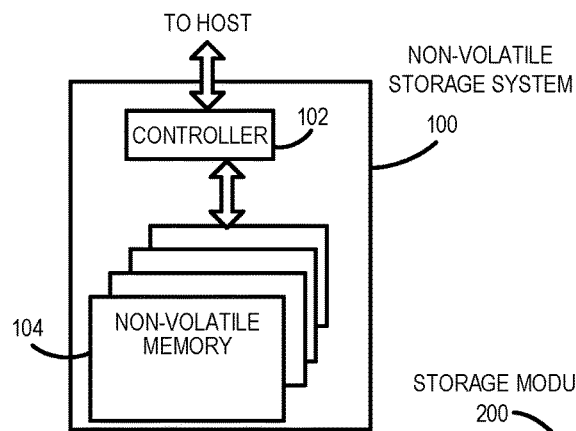
FIG. 1A is a block diagram of a data storage device of an embodiment.
Figure 1B:
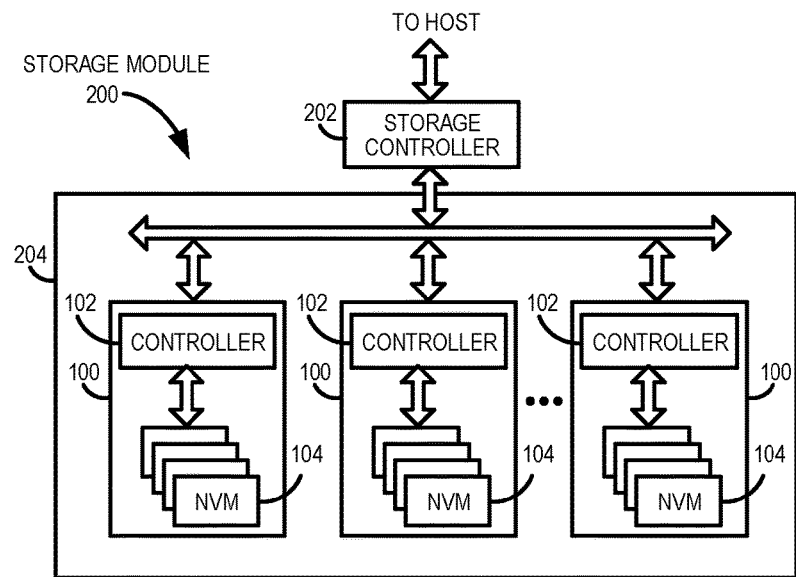
FIG. 1B is a block diagram illustrating a storage module of an embodiment.
Figure 1C:
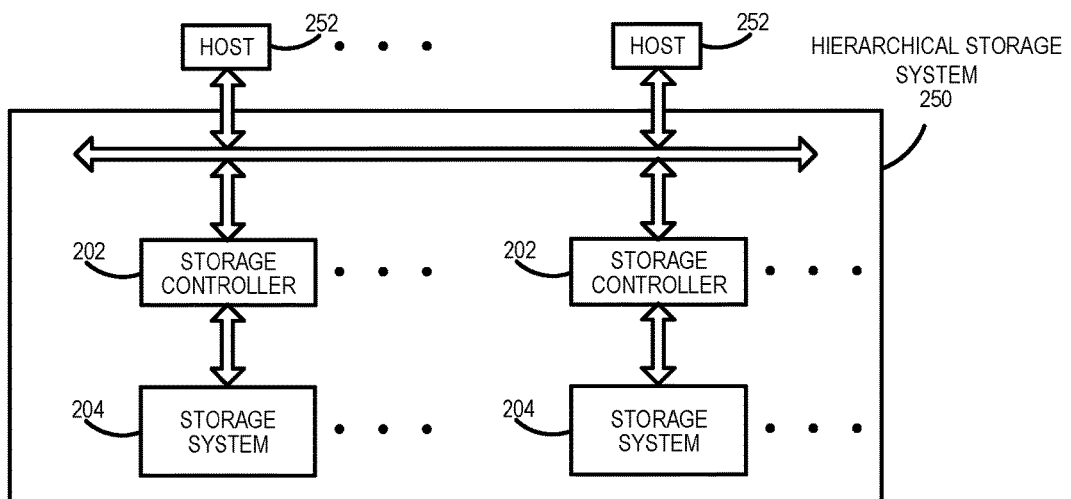
FIG. 1C is a block diagram illustrating a hierarchical storage system of an embodiment.

Data storage devices suitable for use in implementing aspects of these embodiments are shown in FIGS. 1A-1C. FIG. 1A is a block diagram illustrating a data storage device 100 according to an embodiment of the subject matter described herein. Referring to FIG. 1A, data storage device 100 includes a controller 102 and non-volatile memory that may be made up of one or more non-volatile memory die 104. As used herein, the term die refers to the collection of non-volatile memory cells, and associated circuitry for managing the physical operation of those non-volatile memory cells, that are formed on a single semiconductor substrate. Controller 102 interfaces with a host system and transmits command sequences for read, program, and erase operations to non-volatile memory die 104.

The controller 102 (which may be a non-volatile memory controller (e.g., a flash, resistive random-access memory (ReRAM), phase-change memory (PCM), or magnetoresistive random-access memory (MRAM) controller)) can take the form of processing circuitry, a microprocessor or processor, and a computer-readable medium that stores computer-readable program code (e.g., firmware) executable by the (micro) processor, logic gates, switches, an application specific integrated circuit (ASIC), a programmable logic controller, and an embedded microcontroller, for example. The controller 102 can be configured with hardware and/or firmware to perform the various functions described below and shown in the flow diagrams. Also, some of the components shown as being internal to the controller can also be stored external to the controller, and other components can be used. Additionally, the phrase "operatively in communication with" could mean directly in communication with or indirectly (wired or wireless) in communication with through one or more components, which may or may not be shown or described herein.

As used herein, a non-volatile memory controller is a device that manages data stored on non-volatile memory and communicates with a host, such as a computer or electronic device. A non-volatile memory controller can have various functionality in addition to the specific functionality described herein. For example, the non-volatile memory controller can format the non-volatile memory to ensure the memory is operating properly, map out bad non-volatile memory cells, and allocate spare cells to be substituted for future failed cells. Some part of the spare cells can be used to hold firmware to operate the non-volatile memory controller and implement other features. In operation, when a host needs to read data from or write data to the non-volatile memory, it can communicate with the non-volatile memory controller. If the host provides a logical address to which data is to be read/written, the non-volatile memory controller can convert the logical address received from the host to a physical address in the non-volatile memory. (Alternatively, the host can provide the physical address.) The non-volatile memory controller can also perform various memory management functions, such as, but not limited to, wear leveling (distributing writes to avoid wearing out specific blocks of memory that would otherwise be repeatedly written to) and garbage collection (after a block is full, moving only the valid pages of data to a new block, so the full block can be erased and reused).

Non-volatile memory die 104 may include any suitable non-volatile storage medium, including resistive random-access memory (ReRAM), magnetoresistive random-access memory (MRAM), phase-change memory (PCM), NAND flash memory cells and/or NOR flash memory cells. The memory cells can take the form of solid-state (e.g., flash) memory cells and can be one-time programmable, few-time programmable, or many-time programmable. The memory cells can also be single-level cells (SLC), multiple-level cells (MLC) (e.g., dual-level cells, triple-level cells (TLC), quad-level cells (QLC), etc.) or use other memory cell level technologies, now known or later developed. Also, the memory cells can be fabricated in a two-dimensional or three-dimensional fashion.

The interface between controller 102 and non-volatile memory die 104 may be any suitable flash interface, such as Toggle Mode 200, 400, or 800. In one embodiment, the data storage device 100 may be a card based system, such as a secure digital (SD) or a micro secure digital (micro-SD) card. In an alternate embodiment, the data storage device 100 may be part of an embedded data storage device.

Although, in the example illustrated in FIG. 1A, the data storage device 100 (sometimes referred to herein as a storage module) includes a single channel between controller 102 and non-volatile memory die 104, the subject matter described herein is not limited to having a single memory channel. For example, in some architectures (such as the ones shown in FIGS. 1B and 1C), two, four, eight or more memory channels may exist between the controller and the memory device, depending on controller capabilities. In any of the embodiments described herein, more than a single channel may exist between the controller and the memory die, even if a single channel is shown in the drawings.

FIG. 1B illustrates a storage module 200 that includes plural non-volatile data storage devices 100. As such, storage module 200 may include a storage controller 202 that interfaces with a host and with data storage device 204, which includes a plurality of data storage devices 100. The interface between storage controller 202 and data storage devices 100 may be a bus interface, such as a serial advanced technology attachment (SATA), peripheral component interconnect express (PCIe) interface, or double-data-rate (DDR) interface. Storage module 200, in one embodiment, may be a solid state drive (SSD), or non-volatile dual in-line memory module (NVDIMM), such as found in server PC or portable computing devices, such as laptop computers, and tablet computers.

FIG. 1C is a block diagram illustrating a hierarchical storage system. A hierarchical storage system 250 includes a plurality of storage controllers 202, each of which controls a respective data storage device 204. Host systems 252 may access memories within the storage system 250 via a bus interface. In one embodiment, the bus interface may be a Non-Volatile Memory Express (NVMe) or Fibre Channel over Ethernet (FCOE) interface. In one embodiment, the system illustrated in FIG. 1C may be a rack mountable mass storage system that is accessible by multiple host computers, such as would be found in a data center or other location where mass storage is needed.

Figure 2A:
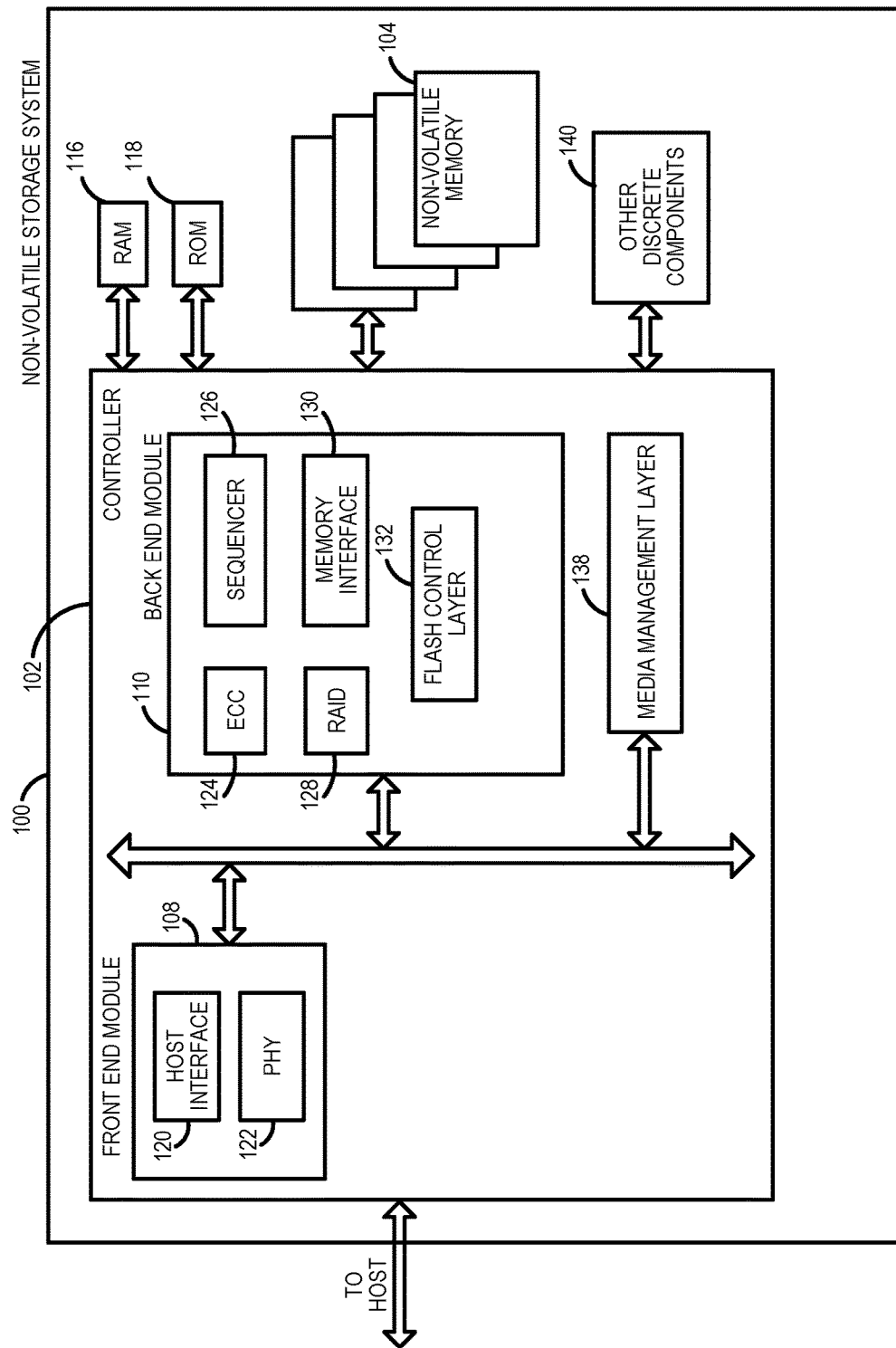
FIG. 2A is a block diagram illustrating components of the controller of the data storage device illustrated in FIG. 1A according to an embodiment.

FIG. 2A is a block diagram illustrating components of controller 102 in more detail. Controller 102 includes a front-end module 108 that interfaces with a host, a back-end module 110 that interfaces with the one or more non-volatile memory die 104, and various other modules that perform functions which will now be described in detail. A module may take the form of a packaged functional hardware unit designed for use with other components, a portion of a program code (e.g., software or firmware) executable by a (micro) processor or processing circuitry that usually performs a particular function of related functions, or a self-contained hardware or software component that interfaces with a larger system, for example. Also, "means" for performing a function can be implemented with at least any of the structure noted herein for the controller and can be pure hardware or a combination of hardware and computer-readable program code.

Referring again to modules of the controller 102, a buffer manager/bus controller manages buffers in random access memory (RAM) 116 and controls the internal bus arbitration of controller 102. A read only memory (ROM) 118 stores system boot code. Although illustrated in FIG. 2A as located separately from the controller 102, in other embodiments one or both of the RAM 116 and ROM 118 may be located within the controller. In yet other embodiments, portions of RAM and ROM may be located both within the controller 102 and outside the controller.

Front-end module 108 includes a host interface 120 and a physical layer interface (PHY) 122 that provide the electrical interface with the host or next level storage controller. The choice of the type of host interface 120 can depend on the type of memory being used. Examples of host interfaces 120 include, but are not limited to, SATA, SATA Express, serially attached small computer system interface (SAS), Fibre Channel, universal serial bus (USB), PCIe, and NVMe. The host interface 120 typically facilitates transfer for data, control signals, and timing signals.

Back-end module 110 includes an error correction code (ECC) engine 124 that encodes the data bytes received from the host, and decodes and error corrects the data bytes read from the non-volatile memory. A command sequencer 126 generates command sequences, such as program and erase command sequences, to be transmitted to non-volatile memory die 104. A RAID (Redundant Array of Independent Drives) module 128 manages generation of RAID parity and recovery of failed data. The RAID parity may be used as an additional level of integrity protection for the data being written into the memory device 104. In some cases, the RAID module 128 may be a part of the ECC engine 124. A memory interface 130 provides the command sequences to non-volatile memory die 104 and receives status information from non-volatile memory die 104. In one embodiment, memory interface 130 may be a double data rate (DDR) interface, such as a Toggle Mode 200, 400, or 800 interface. A flash control layer 132 controls the overall operation of back-end module 110.

The data storage device 100 also includes other discrete components 140, such as external electrical interfaces, external RAM, resistors, capacitors, or other components that may interface with controller 102. In alternative embodiments, one or more of the physical layer interface 122, RAID module 128, media management layer 138 and buffer management/bus controller are optional components that are not necessary in the controller 102.

Figure 2B:
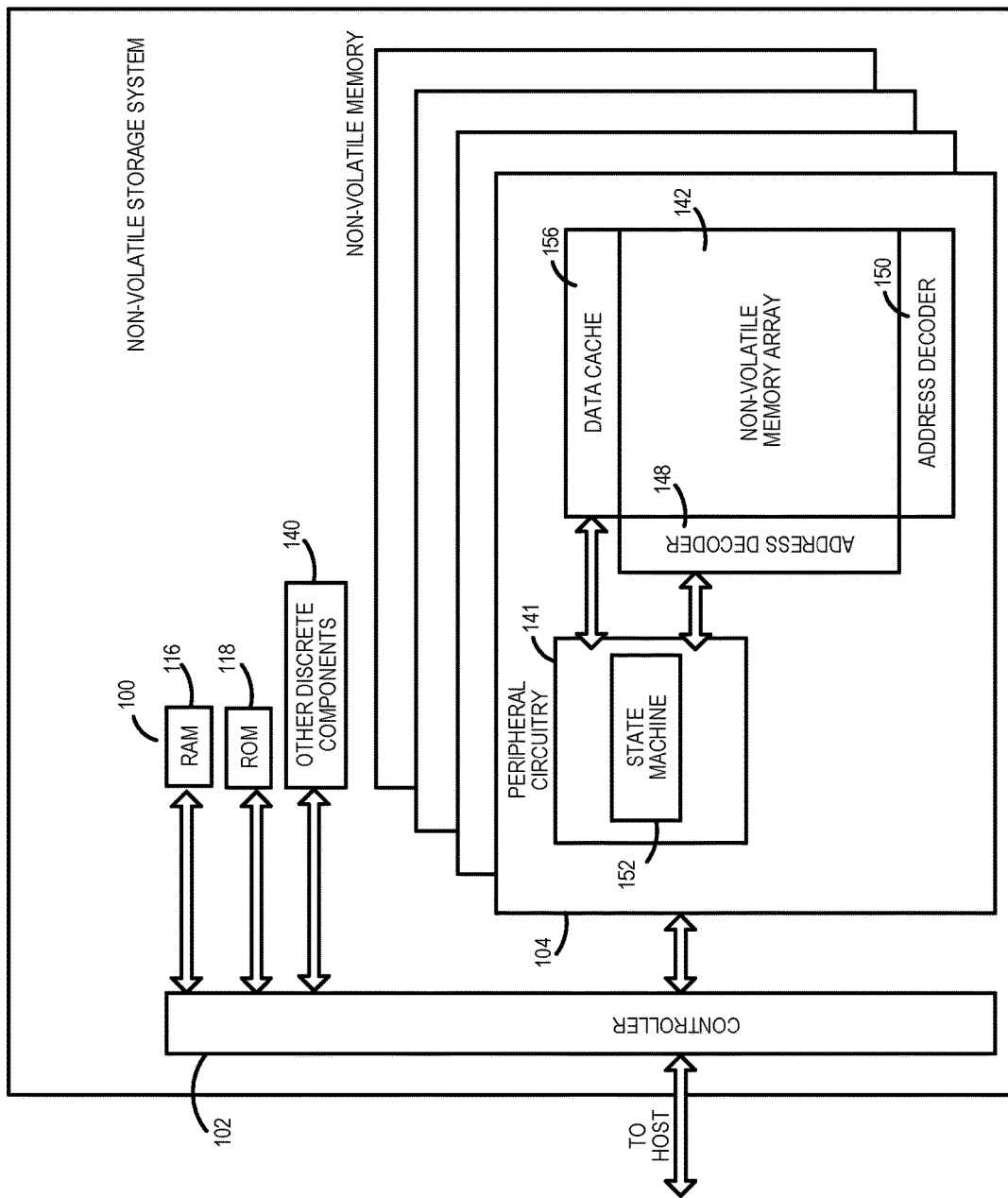
FIG. 2B is a block diagram illustrating components of the memory data storage device illustrated in FIG. 1A according to an embodiment.

FIG. 2B is a block diagram illustrating components of non-volatile memory die 104 in more detail. Non-volatile memory die 104 includes peripheral circuitry 141 and non-volatile memory array 142. Non-volatile memory array 142 includes the non-volatile memory cells used to store data. The non-volatile memory cells may be any suitable non-volatile memory cells, including ReRAM, MRAM, PCM, NAND flash memory cells and/or NOR flash memory cells in a two-dimensional and/or three-dimensional configuration. Non-volatile memory die 104 further includes a data cache 156 that caches data and row and address decoders 148, 150. Peripheral circuitry 141 includes a state machine 152 that provides status information to the controller 102.

Returning again to FIG. 2A, the flash control layer 132 (which will be referred to herein as the flash translation layer (FTL) or, more generally, the "media management layer," as the memory may not be flash) handles flash errors and interfaces with the host. In particular, the FTL, which may be an algorithm in firmware, is responsible for the internals of memory management and translates writes from the host into writes to the memory 104. The FTL may be needed because the memory 104 may have limited endurance, may be written in only multiples of pages, and/or may not be written unless it is erased as a block. The FTL understands these potential limitations of the memory 104, which may not be visible to the host. Accordingly, the FTL attempts to translate the writes from host into writes into the memory 104.

The FTL may include a logical-to-physical address (L2P) map (sometimes referred to herein as a table or data structure) and allotted cache memory. In this way, the FTL translates logical block addresses ("LBAs") from the host to physical addresses in the memory 104. The FTL can include other features, such as, but not limited to, power-off recovery (so that the data structures of the FTL can be recovered in the event of a sudden power loss) and wear leveling (so that the wear across memory blocks is even to prevent certain blocks from excessive wear, which would result in a greater chance of failure).

Figure 3:
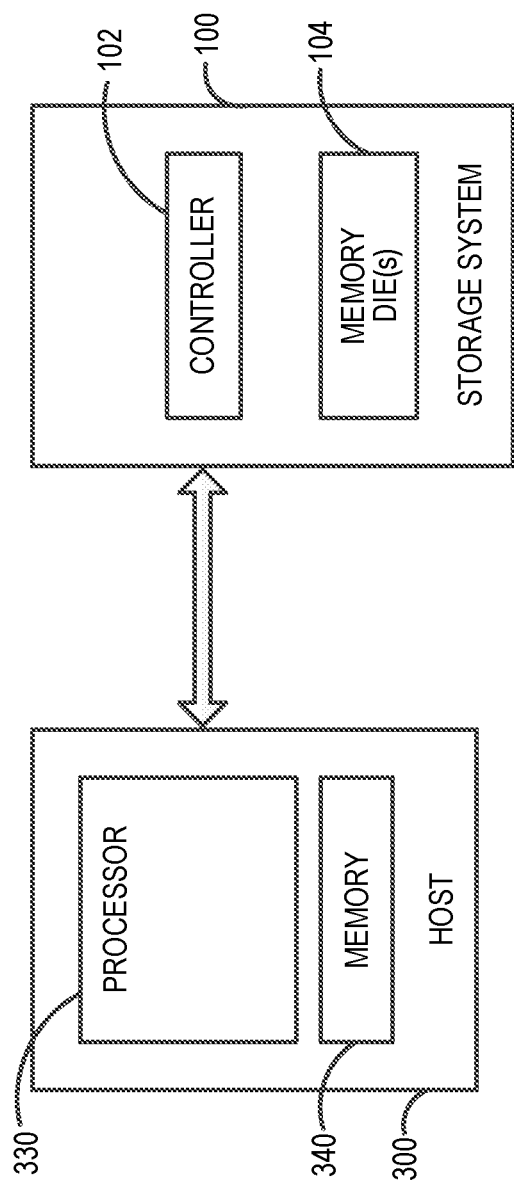
FIG. 3 is a block diagram of a host and data storage device of an embodiment.

Turning again to the drawings, FIG. 3 is a block diagram of a host 300 and data storage device 100 of an embodiment. The host 300 can take any suitable form, including, but not limited to, a computer, a mobile phone, a tablet, a wearable device, a digital video recorder, a surveillance system, etc. The host 300 in this embodiment (here, a computing device) comprises a processor 330 and a memory 340. In one embodiment, computer-readable program code stored in the host memory 340 configures the host processor 330 to perform the acts described herein. So, actions performed by the host 300 are sometimes referred to herein as being performed by an application (computer-readable program code) run on the host 300. For example, the host 300 can be configured to send data (e.g., initially stored in the host's memory 340) to the data storage device 100 for storage in the data storage device's memory 104.

In some data storage devices, asynchronous independent plane read (AIPR) circuitry is used only for host random reads. However, there are many modules in the backend that access the memory 104 with some periodicity as a part of garbage collection (GC) (e.g., a CVD tracking module for updating read parameters, a data retention (DR) module for bit-error rate (BER) calculations, an enhanced post-write read (EPWR) module to validate written data, etc.). Each of these modules can access the memory 104 for different reasons and at different periodicities. Most of these modules can access the memory 104 at a certain physical location to accomplish a task.

Figure 4:
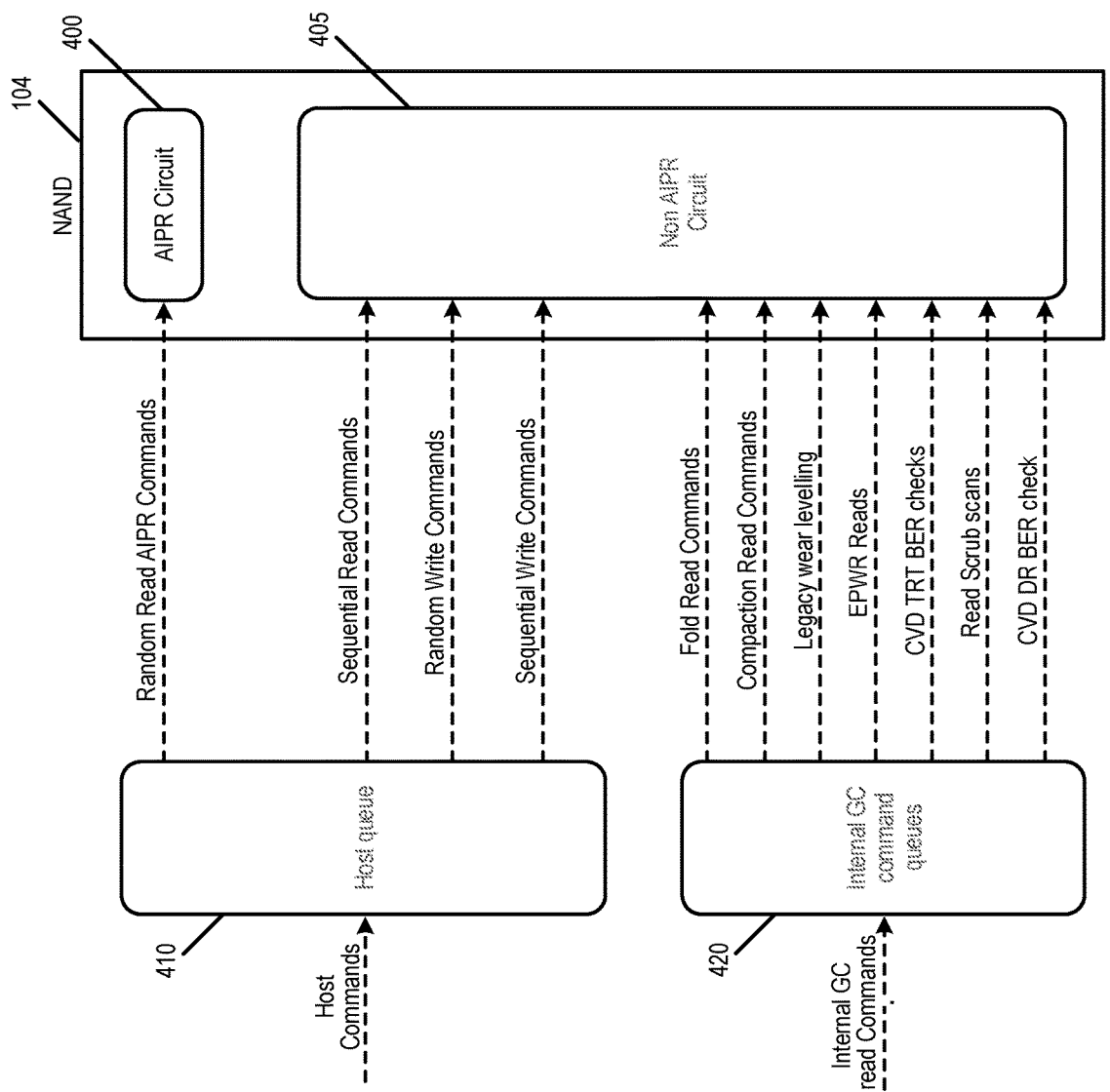
FIG. 4 is a block diagram of a data storage device of an embodiment.

FIG. 4 is a diagram that illustrates a typical flow in the data storage device 100. As shown in FIG. 4, an AIPR circuit 400 in the memory 104 can be used to perform random read AIPR commands from a host queue 410. Also, a non-AIPR circuit 405 in the memory 104 can be used to perform sequential read and write commands and random write commands from the host queue 410. Additionally, the non-AIPR circuit 405 can perform various other commands from an internal garbage collection command queue 420.

The following embodiments present a system flow in which the AIPR circuit 400 in the memory 104 can be used for enhanced quality of service (QOS). These embodiments can use existing memory hardware to improve system resources (e.g., garbage collection). In one embodiment, a module consolidates all memory bit-error rate (BER) check requests (e.g., CVD, EPWR, DR, DMC count read and read scrub), associates them at a plane level, and then uses AIPR commands (e.g., memory commands at a plane level) to perform more-granular and parallel senses for BER determination of all associated modules, thereby improving the efficiency of memory reads. The firmware module will sometimes be referred to herein as the "AIPR GC module."

DR, EPWR, DMC count read, read scrub, and CVD can be implemented as firmware modules that need BER check requests and, hence, perform a read from the memory 104. The efficiency that can be provided by these embodiments can be described in terms of reduced latency for the same amount of work. In one example embodiment, AIPR is used to aid garbage collection assuming DR, EPWR, DMC count read, read scrub, and CVD all fall under the data relocation umbrella. In addition, the AIPR GC module can execute plane-wise memory BER checks in a zig-zag module spanning across multiple wordlines and optionally across multiple blocks, thereby increasing the coverage area for DR, EPWR, DMC count read, read scrub, and CVD BER checks in the data storage device 100 (the phrases read request or BER request from the memory 104 are used interchangeably herein).

Figure 5:
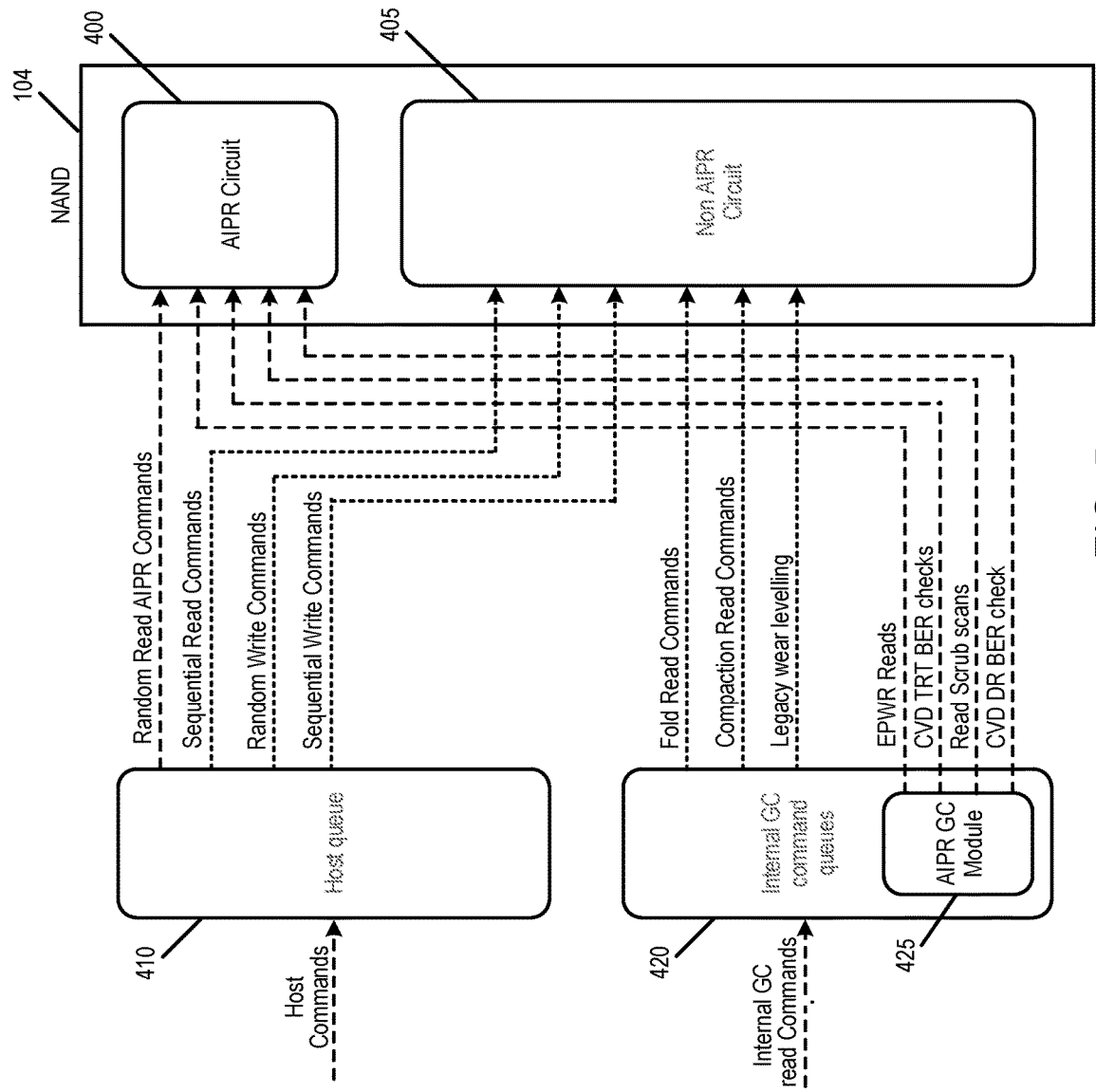
FIG. 5 is a block diagram of a data storage device of an embodiment that uses an asynchronous independent plane read (AIPR) garbage collection module.
Figure 6B:
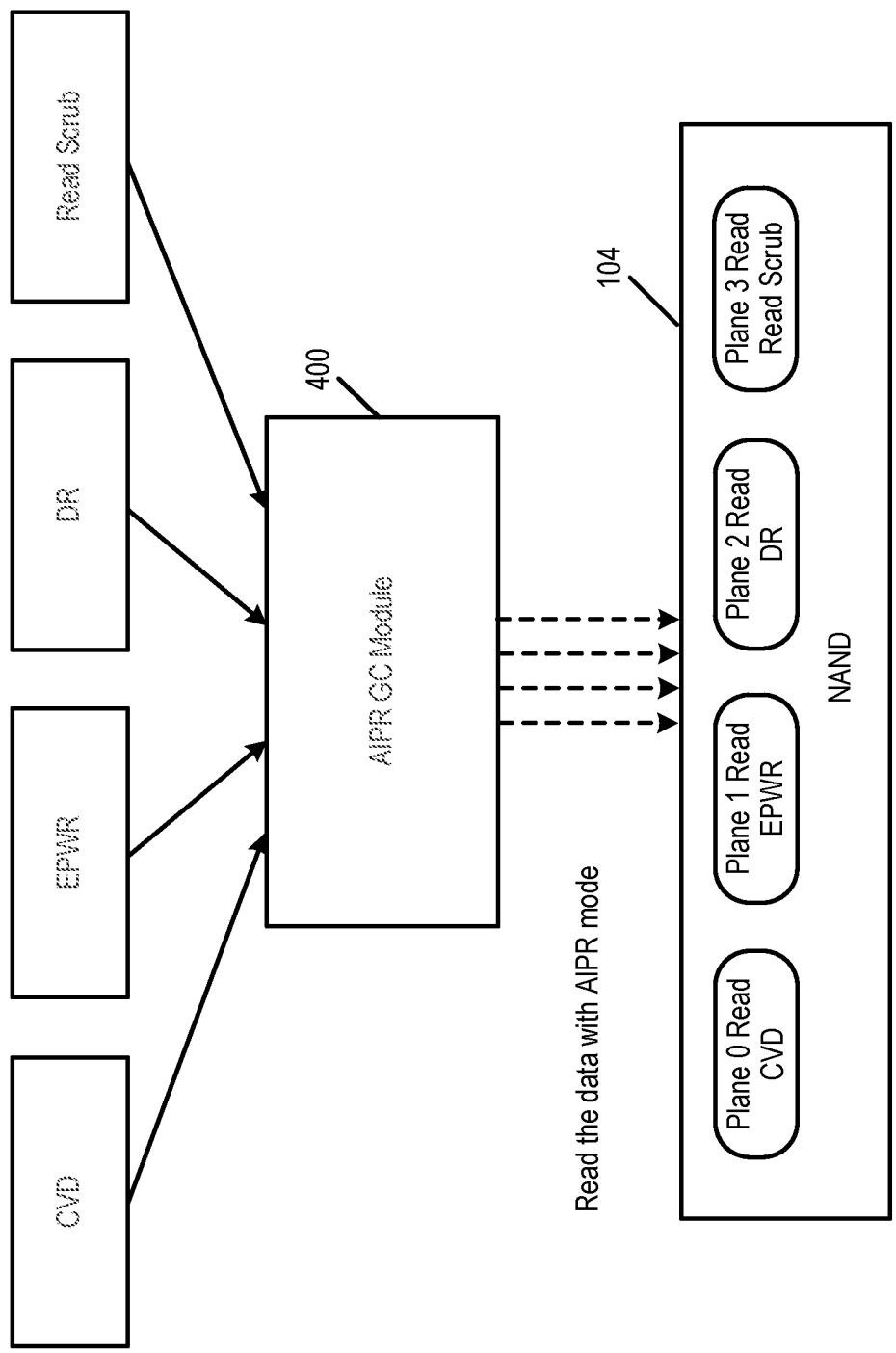

FIG. 5 is a diagram that illustrates one embodiment. As shown in FIG. 5, in addition to performing random AIPR commands, the AIPR circuit 400 can perform various garbage-collection operations from an AIPR garbage collection module 425 in the internal garbage collection command queues 420. There can be improved reads for each of the plane reads across each of the memory dies for different purposes based on whether it is used for EPWR, CVD, or DR with additional firmware logic in a command automation process (CAP), a scheduler for LLFS done prior to LDPC Enc and exclusive- or (XOR). Enabling BER consolidation/reads across various firmware modules can be done in an efficient manner, asynchronously, through the AIPR GC module 425, as shown in FIGS. 6A and 6B.

The flash translation layer (FTL) can statically associate various garbage collection modules for BER checks at the plane level based on memory characterization. It can also be dynamic based on the plane queue load (of AIPR queues of the dies) if characterization data allows so. For example, if the CVD requests are loaded in plane 0 and/or plane 4 of a memory die, EPWR or DR can be loaded into plane 2 or 3 to leverage the maximum out of AIPR. The FTL can also have policies in place so that bare minimum specifications are met with BER checks. For example, based on memory characterization data, it may not perform EPWR in plane 4 at all, in which case, it will effectively use plane 4 for CVD and DR.

Figure 7:
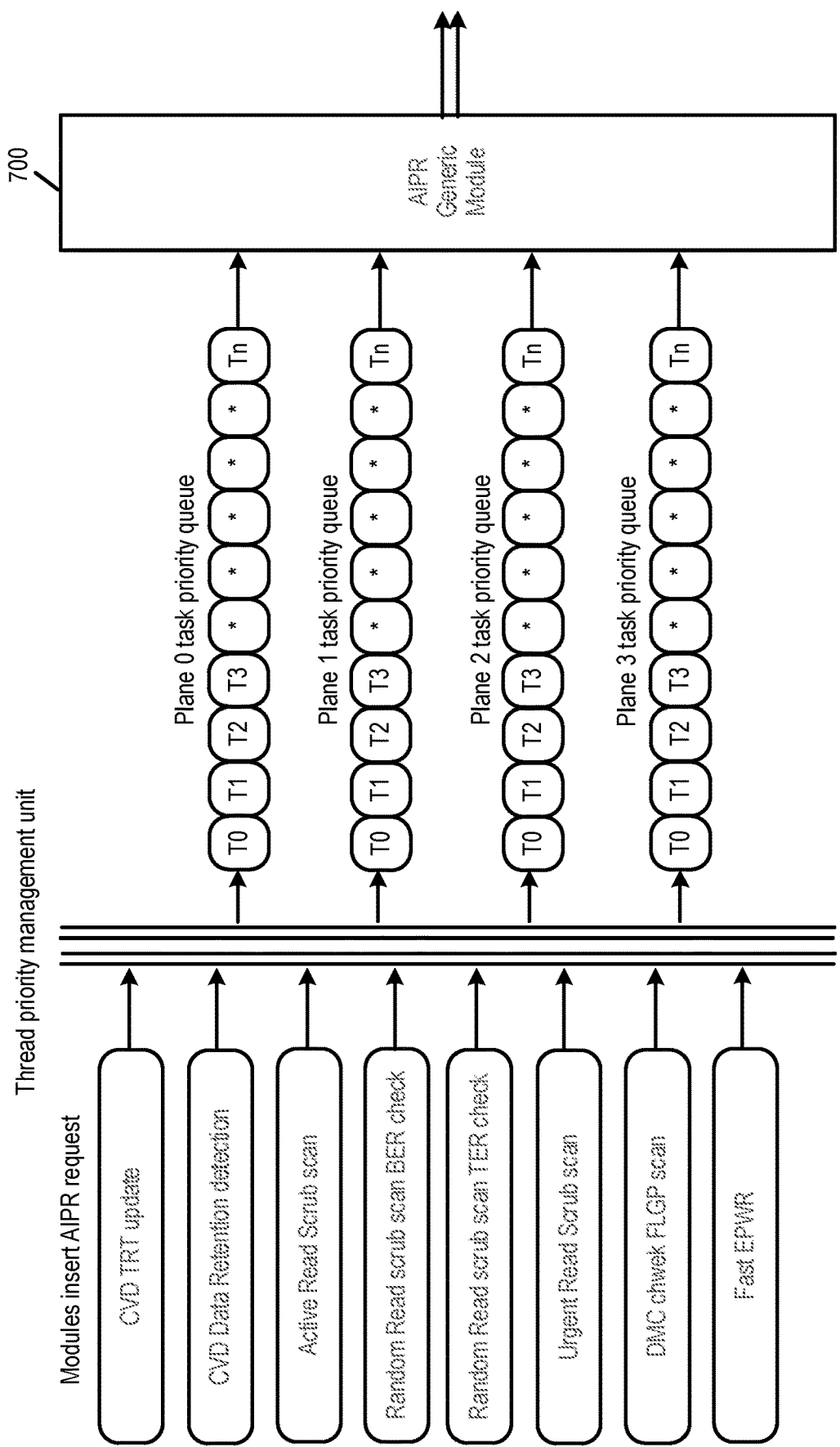
FIG. 7 is an illustration of a thread priority management unit of an embodiment.

Broadly, AIPR is used for different purposes other than host data (random) read, thereby efficiently getting the maximum returns out of invested circuit in the memory die. FIG. 7 presents an AIPR generic module 700 and illustrates how multiple firmware modules share requests to the AIPR garbage collection module 425, which consolidates at different plane and optionally different priority in each of those planes (not shown), which in turn triggers the AIPR circuit 400 in the memory 104 via plane-level commands. The system flow is generic regardless of what type of BER checks are required. In such cases, the flow contains all firmware components, such as DR and CVD, but excludes EPWR if it is not part of a particular product architecture. Note, DR, RS and CVD are typically present in Flash architectures.

During the initial life phase of the memory 104, DR and CVD requirements are typically less frequent, but EPWR BER checks are more frequent (since a write validation check simply follows data writes). Going further into flash cycles, all three (DR, CVD, EPWR) will add up the input queues of the AIPR garbage collection module 425, which in turn will put those requests across appropriate planes as per system policies and execute them in AIPR mode of the memory 104. Optionally, a plane-wise parity request or data request can also be clubbed into the system of this embodiment, wherein they will form another set of input to the AIPR garbage collection module 425.

Many alternatives can be used with these embodiments. For example, apart from the defined system flow where multiple firmware modules participate, it is also possible to use the AIPR logic for specific feature to optimize the hardware utilization. As will be illustrated below, each garbage collection module can queue requests to the AIPR garbage collection module 425, which can execute those tasks in a zig-zag manner.

In another alternative, a cell voltage distribution (CVD). thermal regional ag (TRT) to group together TRT read parameters update can take place. In some systems, the CVD module does a TRT update for only few of the random MetaBlock per physical die. However, these embodiments can allow scanning multiple MetaBlocks at a time. Using AIPR logic, CVD scanning will be very efficient. It should be noted that items described herein across a plane means that they are queued in the AIPR queue per plane and not represented timewise in the Y axis. Hence, in FIG. 8, senses from block 10, 15, 22 and block 30 would be in parallel. More wordlines in BICS8 onwards will increase the number of tiers per die. Multiple tiers can be scanned at the same time by AIPR across all the planes. If there is no plane-to-plane variation, then this embodiment may be particularly efficient (see FIG. 9).

Another alternative relates to CVD data retention detection. In one example (see FIG. 10), four logical pages in case of quad-level cell (QLC) memory and five strings are provided, and there would be an increase in the number of wordlines for BICS8 memory. If there is no plane-to-plane variation, scan multiple pages can be scanned at one time across multiple planes. Such efficient way scanning can reduce the boot time.

In another alternative (see FIG. 11), AIPR is used for fast EPWR. This addresses the problem that occurs due to an increase in the number pages per wordline, the number of string lines, the number of planes in BICS6 X4 EPWR scan total time will increase. In yet another alternative (see FIG. 12), AIPR is used to DMC count check for FLGP scan using AIPR. In this alternative, FLGP scan is used to check the last programmed wordline using a binary search and DMC count value from the memory 104. If binary search scan is done on multiple planes, it save the time using AIPR read.

Figure 13:
FIG. 13 is a chart illustrating a scan operation of an embodiment.
Figure 14:
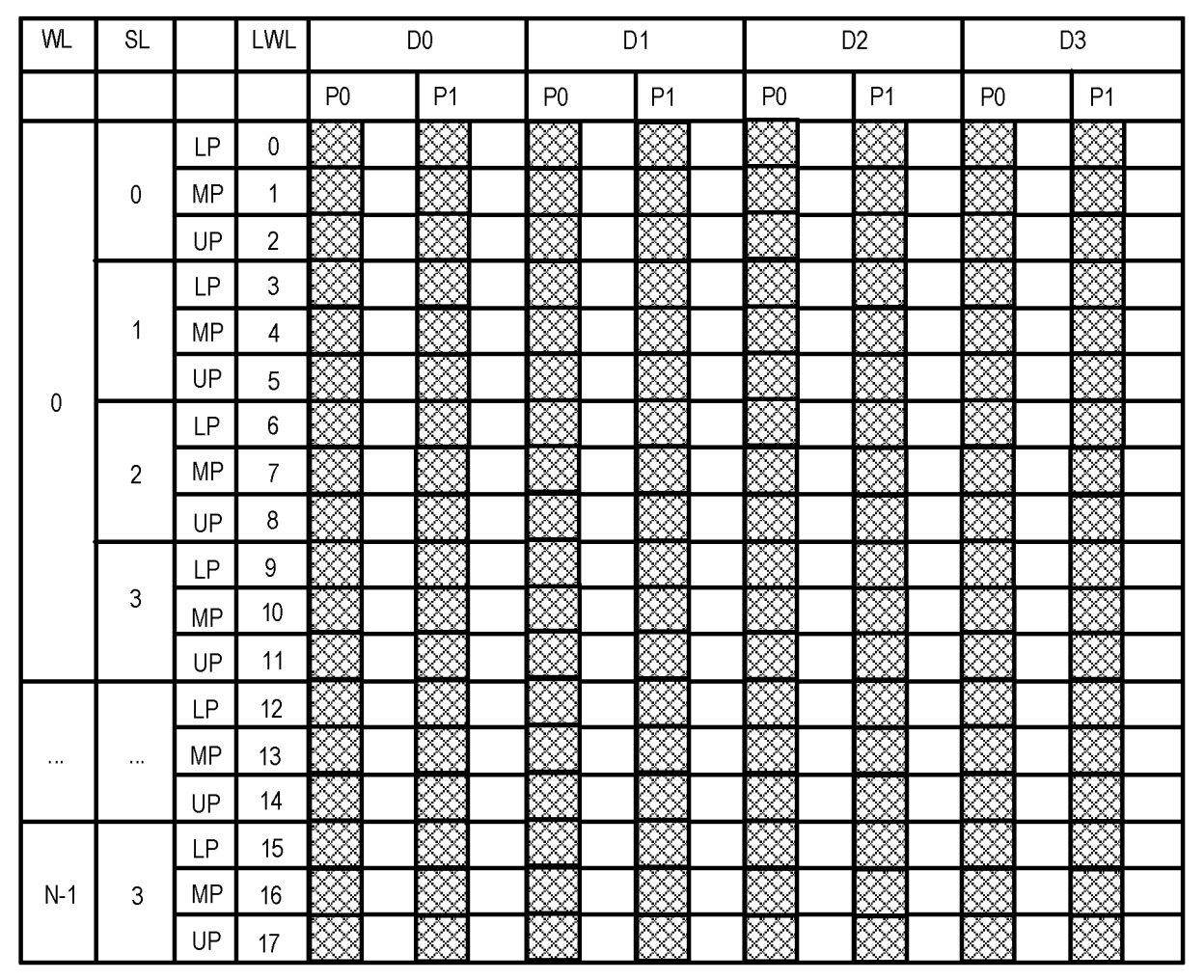

With reference to the alternative shown in FIG. 13, a truly-erased read (TER) check is performed on open blocks. TER can be used to identify the physical defects on open metablocks. This can be used to determine if erased flash management units (FMUs) in an open block have a proper distribution. If a block is not properly erased, errors can occur if the open block is continued to be programmed. With reference to FIG. 14, in another alternative, an active read scrub scan is used to periodically scan metablocks in a partition to detect a high BER problem. Data retention can happen only in specific upper or top pages, so scanning is enough only on some of the pages. If a greater number of errors are detected in the metablock, the metablock can be relocated. It should be noted that if an active read scan is a low-priority scan, it can be clubbed with other CVD scans.

Figure 15:
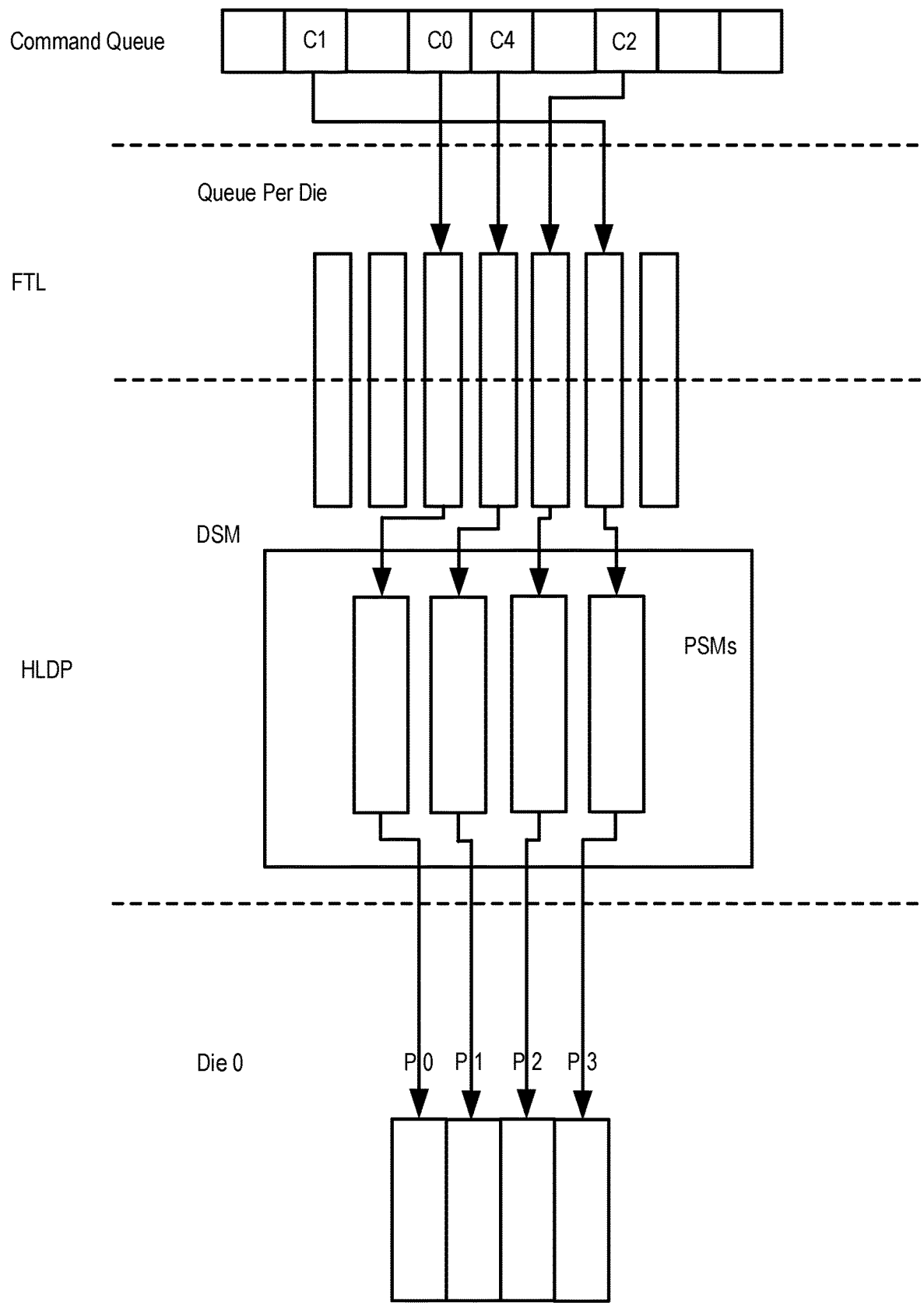
FIG. 15 illustrates an AIPR operation of an embodiment.

In summary, the asynchronous independent plane read (AIPR) feature allows independent plane reads and is configured to meet random host read performance requirements. AIPR is a mechanism to introduce parallelism in the NAND sense process. Multiple planes work in parallel to sense multiple units (e.g., 4 KB) of data across the memory dies enabling more input-output operations per second (IOPS). A firmware software module in the flash translation layer (FTL) can decide to dispatch requests as AIPR read request to the memory based on size of the read requested from host read request. FIG. 15 illustrates an AIPR read, where all four read commands belong to different blocks in different planes. By splitting these commands at plane level, all planes can be sensed at the same time. This provides an improvement in performance during random host reads.

The above embodiments recognize that certain garbage collection modules (e.g., CVD, EPWR, etc.) access data at a plane level. In traditional garbage collection, the modules will be accessed in sequence (serially) since modules accessing the memory at plane level do so at different periodicities. In the above embodiments, a garbage collection AIPR module consolidates all such request at the plane level. Since there are many requests from various modules, this module accesses the planes independently and efficiently (in parallel). Without the garbage collection AIPR module, there would not be any request consolidation and, hence, not much advantage from AIPR since to leverage the AIPR circuitry, the requests across multiple planes should be sequenced properly. So, with these embodiments, AIPR can be used not for random read commands, but also for garbage-collection-related commands, such as, but not limited to, EPWR read, data retention check read, CVD TRT update read requests, read scrub read requests, and FLGP scan reads. Further, the memory can internally distinguish between AIPR and non-AIPR read requests based on the read length or type of read request if the read is at the die or plane level.

Finally, as mentioned above, any suitable type of memory can be used. Semiconductor memory devices include volatile memory devices, such as dynamic random access memory ("DRAM") or static random access memory ("SRAM") devices, non-volatile memory devices, such as resistive random access memory ("ReRAM"), electrically erasable programmable read only memory ("EEPROM"), flash memory (which can also be considered a subset of EEPROM), ferroelectric random access memory ("FRAM"), and magnetoresistive random access memory ("MRAM"), and other semiconductor elements capable of storing information. Each type of memory device may have different configurations. For example, flash memory devices may be configured in a NAND or a NOR configuration.

The memory devices can be formed from passive and/or active elements, in any combinations. By way of non-limiting example, passive semiconductor memory elements include ReRAM device elements, which in some embodiments include a resistivity switching storage element, such as an anti-fuse, phase change material, etc., and optionally a steering element, such as a diode, etc. Further by way of non-limiting example, active semiconductor memory elements include EEPROM and flash memory device elements, which in some embodiments include elements containing a charge storage region, such as a floating gate, conductive nanoparticles, or a charge storage dielectric material.

Multiple memory elements may be configured so that they are connected in series or so that each element is individually accessible. By way of non-limiting example, flash memory devices in a NAND configuration (NAND memory) typically contain memory elements connected in series. A NAND memory array may be configured so that the array is composed of multiple strings of memory in which a string is composed of multiple memory elements sharing a single bit line and accessed as a group. Alternatively, memory elements may be configured so that each element is individually accessible, e.g., a NOR memory array. NAND and NOR memory configurations are examples, and memory elements may be otherwise configured.

The semiconductor memory elements located within and/or over a substrate may be arranged in two or three dimensions, such as a two-dimensional memory structure or a three-dimensional memory structure.

In a two-dimensional memory structure, the semiconductor memory elements are arranged in a single plane or a single memory device level. Typically, in a two-dimensional memory structure, memory elements are arranged in a plane (e.g., in an x-z direction plane) which extends substantially parallel to a major surface of a substrate that supports the memory elements. The substrate may be a wafer over or in which the layer of the memory elements are formed or it may be a carrier substrate which is attached to the memory elements after they are formed. As a non-limiting example, the substrate may include a semiconductor such as silicon.

The memory elements may be arranged in the single memory device level in an ordered array, such as in a plurality of rows and/or columns. However, the memory elements may be arrayed in non-regular or non-orthogonal configurations. The memory elements may each have two or more electrodes or contact lines, such as bit lines and wordlines.

A three-dimensional memory array is arranged so that memory elements occupy multiple planes or multiple memory device levels, thereby forming a structure in three dimensions (i.e., in the x, y and z directions, where the y direction is substantially perpendicular and the x and z directions are substantially parallel to the major surface of the substrate).

As a non-limiting example, a three-dimensional memory structure may be vertically arranged as a stack of multiple two dimensional memory device levels. As another non-limiting example, a three dimensional memory array may be arranged as multiple vertical columns (e.g., columns extending substantially perpendicular to the major surface of the substrate, i.e., in the y direction) with each column having multiple memory elements in each column. The columns may be arranged in a two dimensional configuration, e.g., in an x-z plane, resulting in a three dimensional arrangement of memory elements with elements on multiple vertically stacked memory planes. Other configurations of memory elements in three dimensions can also constitute a three dimensional memory array.

By way of non-limiting example, in a three dimensional NAND memory array, the memory elements may be coupled together to form a NAND string within a single horizontal (e.g., x-z) memory device levels. Alternatively, the memory elements may be coupled together to form a vertical NAND string that traverses across multiple horizontal memory device levels. Other three dimensional configurations can be envisioned wherein some NAND strings contain memory elements in a single memory level while other strings contain memory elements which span through multiple memory levels. Three dimensional memory arrays may also be designed in a NOR configuration and in a ReRAM configuration.

Typically, in a monolithic three dimensional memory array, one or more memory device levels are formed above a single substrate. Optionally, the monolithic three dimensional memory array may also have one or more memory layers at least partially within the single substrate. As a non-limiting example, the substrate may include a semiconductor such as silicon. In a monolithic three dimensional array, the layers constituting each memory device level of the array are typically formed on the layers of the underlying memory device levels of the array. However, layers of adjacent memory device levels of a monolithic three dimensional memory array may be shared or have intervening layers between memory device levels.

Then again, two dimensional arrays may be formed separately and then packaged together to form a non-monolithic memory device having multiple layers of memory. For example, non-monolithic stacked memories can be constructed by forming memory levels on separate substrates and then stacking the memory levels atop each other. The substrates may be thinned or removed from the memory device levels before stacking, but as the memory device levels are initially formed over separate substrates, the resulting memory arrays are not monolithic three dimensional memory arrays. Further, multiple two dimensional memory arrays or three dimensional memory arrays (monolithic or non-monolithic) may be formed on separate chips and then packaged together to form a stacked-chip memory device.

Associated circuitry is typically required for operation of the memory elements and for communication with the memory elements. As non-limiting examples, memory devices may have circuitry used for controlling and driving memory elements to accomplish functions such as programming and reading. This associated circuitry may be on the same substrate as the memory elements and/or on a separate substrate. For example, a controller for memory read-write operations may be located on a separate controller chip and/or on the same substrate as the memory elements.

One of skill in the art will recognize that this invention is not limited to the two dimensional and three-dimensional structures described but cover all relevant memory structures within the spirit and scope of the invention as described herein and as understood by one of skill in the art.

It is intended that the foregoing detailed description be understood as an illustration of selected forms that the invention can take and not as a definition of the invention. It is only the following claims, including all equivalents, that are intended to define the scope of the claimed invention. Finally, it should be noted that any aspect of any of the embodiments described herein can be used alone or in combination with one another.

What is claimed is:

1. In a data storage device comprising a memory comprising a plurality of memory dies and asynchronous independent plane read (AIPR) circuitry, a method comprising:
   receiving a plurality of memory bit-error rate (BER) check requests from a respective plurality of garbage collection modules in the data storage device, wherein the plurality of memory BER check requests are generated by the plurality of garbage collection modules at different times; and
   instead of sending the plurality of memory BER check requests to the memory to execute sequentially as the plurality of memory BER check requests are received at the different times:
      consolidating the plurality of memory BER check requests such that BER check requests from respective garbage collection modules are consolidated for respective different planes of the plurality of memory dies; and
      sending the consolidated plurality of memory BER check requests to the AIPR circuitry to execute the BER check requests for the garbage collection modules in parallel across the respective planes of the plurality of memory dies.

2. The method of claim 1, wherein at least one of the plurality of memory BER check requests is part of an enhanced post-write read (EPWR) operation.

3. The method of claim 1, wherein at least one of the plurality of memory BER check requests is part of a read scrub operation.

4. The method of claim 1, wherein at least one of the plurality of memory BER check requests is part of a cell voltage distribution (CVD) thermal regional tag (TRT) bit error rate (BER) check.

5. The method of claim 1, wherein at least one of the plurality of memory BER check requests is part of a cell voltage distribution (CVD) data retention (DR) bit error rate (BER) check.

6. The method of claim 1, wherein at least one of the plurality of memory BER check requests is part of a memory scanning operation.

7. The method of claim 1, further comprising:
   with the AIPR circuitry, distinguishing between AIPR and non-AIPR read requests based on read length.

8. The method of claim 1, further comprising:
   with the AIPR circuitry, distinguishing between AIPR and non-AIPR read requests based on read type.

9. A data storage device comprising:
   a memory comprising:
      a plurality of memory dies;
      asynchronous independent plane read (AIPR) circuitry configured to sense data from planes of the plurality of memory dies in parallel;
      non-AIPR circuitry configured to sense data from planes of the plurality of memory dies sequentially; and
   means for:
      receiving a plurality of memory bit-error rate (BER) check requests from a respective plurality of garbage collection modules in the data storage device, wherein the plurality of memory BER check requests are generated by the plurality of garbage collection modules at different times; and
      instead of sending the plurality of memory BER check requests to the memory to execute sequentially as the plurality of memory BER check requests are received at the different times:
         consolidating the plurality of memory BER check requests such that BER check requests from respective garbage collection modules are consolidated for respective different planes of the plurality of memory dies; and
         sending the consolidated plurality of memory BER check requests to the AIPR circuitry in the memory to execute the BER check requests for the garbage collection modules in parallel across the respective planes of the plurality of memory dies.

10. A data storage device comprising:
    a memory comprising:
       a plurality of memory dies;
       asynchronous independent plane read (AIPR) circuitry configured to sense data from planes of the plurality of memory dies in parallel;
       non-AIPR circuitry configured to sense data from planes of the plurality of memory dies sequentially; and
    a processor coupled with the memory and configured to:
       receive a plurality of memory bit-error rate (BER) check requests from a respective plurality of garbage collection modules in the data storage device, wherein the plurality of memory BER check requests are generated by the plurality of garbage collection modules at different times; and
       instead of sending the plurality of memory BER check requests to the memory to execute sequentially as the plurality of memory BER check requests are received at the different times:
          consolidate the plurality of memory BER check requests such that BER check requests from respective garbage collection modules are consolidated for respective different planes of the plurality of memory dies; and
          send the consolidated plurality of memory BER check requests to the AIPR circuitry in the memory to execute the BER check requests for the garbage collection modules in parallel across the respective planes of the plurality of memory dies.

11. The data storage of claim 10, wherein the AIPR circuitry is further configured to distinguish between AIPR and non-AIPR read requests based on read length.

12. The data storage of claim 10, wherein the AIPR circuitry is further configured to distinguish between AIPR and non-AIPR read requests based type of read.

13. The data storage device of claim 10, wherein at least one of the plurality of memory BER check requests is part of an enhanced post-write read (EPWR) operation.

14. The data storage device of claim 10, wherein at least one of the plurality of memory BER check requests is part of a read scrub operation.

15. The data storage device of claim 10, wherein at least one of the plurality of memory BER check requests is part of a cell voltage distribution (CVD) thermal regional tag (TRT) bit error rate (BER) check.

16. The data storage device of claim 10, wherein at least one of the plurality of memory BER check requests is part of a cell voltage distribution (CVD) data retention (DR) bit error rate (BER) check.

17. The data storage device of claim 10, wherein at least one of the plurality of memory BER check requests is part of a memory scanning operation.

18. The data storage device of claim 10, wherein the processor is further configured to send a plurality of random read commands to the AIPR circuitry in the memory to execute in parallel across the plurality of memory dies.

19. The data storage device of claim 10, wherein at least one of the plurality of memory dies comprises a three-dimensional memory array.

\* \* \* \* \*